(12) United States Patent
Mülenbruch

(10) Patent No.: US 9,126,368 B2
(45) Date of Patent: Sep. 8, 2015

(54) FOIL APPLICATOR FOR APPLYING FOIL ON A SURFACE

(75) Inventor: Ferdinand Mülenbruch, Klundert (NL)

(73) Assignee: MUHLENBRUCH BEHEER B.V., Klundert (NL)

( * ) Notice: Subject to any disclaimer, the term of this patent is extended or adjusted under 35 U.S.C. 154(b) by 123 days.

(21) Appl. No.: 13/991,346

(22) PCT Filed: Nov. 24, 2011

(86) PCT No.: PCT/NL2011/050798
§ 371 (c)(1),
(2), (4) Date: Aug. 26, 2013

(87) PCT Pub. No.: WO2012/074384
PCT Pub. Date: Jun. 7, 2012

(65) Prior Publication Data
US 2014/0290868 A1    Oct. 2, 2014

(30) Foreign Application Priority Data
Dec. 2, 2010    (NL) ..................................... 2005805

(51) Int. Cl.
*B32B 37/00* (2006.01)
*B29C 63/02* (2006.01)
*B25F 1/00* (2006.01)
*B25G 1/10* (2006.01)
*B29C 63/00* (2006.01)

(52) U.S. Cl.
CPC . *B29C 63/02* (2013.01); *B25F 1/00* (2013.01); *B25G 1/102* (2013.01); *B29C 63/0004* (2013.01); *B29C 2063/027* (2013.01); *Y10T 156/18* (2015.01)

(58) Field of Classification Search
CPC    B29C 63/02; B29C 2063/027; B29C 66/861; B25F 1/00; B25G 1/102
USPC .............................. 156/71, 574, 579; 425/458
See application file for complete search history.

(56) References Cited

U.S. PATENT DOCUMENTS

| | | |
|---|---|---|
| 5,251,351 A | 10/1993 | Klotz et al. |
| 5,725,727 A | 3/1998 | Tutewohl |
| 7,225,848 B2 * | 6/2007 | Williams ...................... 156/574 |
| 8,012,280 B1 * | 9/2011 | Thorpe .......................... 156/71 |
| 2007/0084558 A1 | 4/2007 | Horner et al. |
| 2009/0145557 A1 | 6/2009 | Graham et al. |

OTHER PUBLICATIONS

International Search Report and Written Opinion dated Feb. 21, 2013, issued for corresponding PCT/NL2011/050798.

* cited by examiner

*Primary Examiner* — James Sells
(74) *Attorney, Agent, or Firm* — Banner & Witcoff, Ltd.

(57) ABSTRACT

The present invention relates to a foil applicator, such as a spatula (1), for applying foil, in particular self-adhesive foil, to a surface, for instance the bodywork of a car. It is the object according to the present invention to provide an improved foil applicator. For this purpose the handgrip (2) is elongate and the pressing edge (5) lies at an angle relative to the handgrip. The foil applicator further comprises at least one hook (7, 8). Using the hook adhered foil can be pulled back, for instance out of or from edges, seams and transitions, in the event air bubbles have been included in the foil, without having to pick up another tool, which would take some time and during which time the foil could adhere more fixedly to the surface and the foil could be damaged even more when—after another tool has been picked up—it must then be released at or from the edges, seams and transitions.

10 Claims, 1 Drawing Sheet

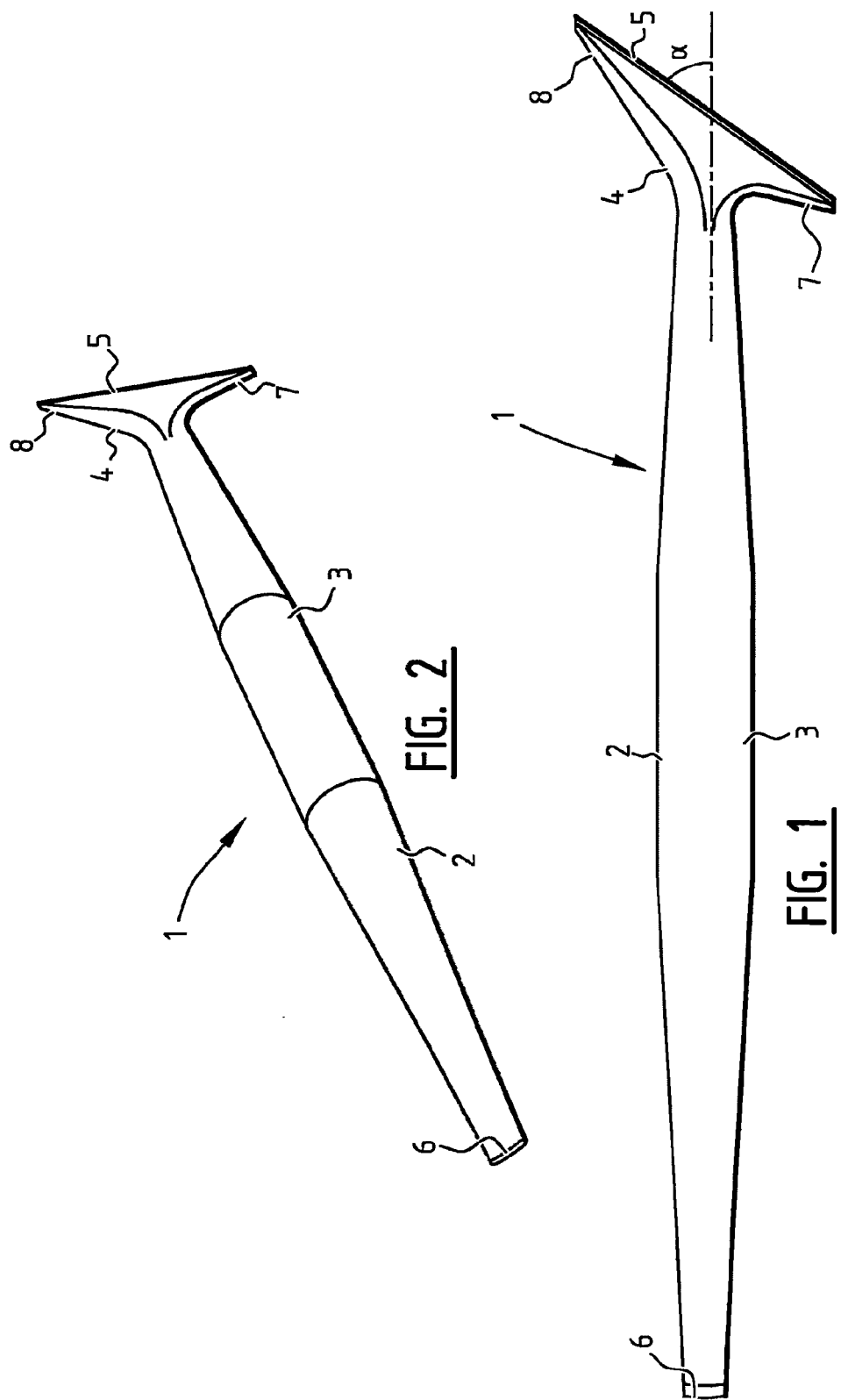

FOIL APPLICATOR FOR APPLYING FOIL ON A SURFACE

RELATED APPLICATION DATA

This application is a National Stage Application under 35 U.S.C. 371 of co-pending PCT Application PCT/NL2011/050798, designating the United States and filed Nov. 24, 2011, titled "Foil Applicator for Applying Foil on a Surface", which claims the priority benefit of NL Patent Application No. 2005805, filed Dec. 2, 2010, titled "Foil Applicator for Applying Foil on a Surface", the priority benefit of each of which is claimed and the entire disclosure of each of which is hereby incorporated by reference for all purposes.

The present invention relates to a foil applicator, such as a spatula, for applying foil, in particular self-adhesive foil, to a surface, for instance the bodywork of a car.

Foil applicators for applying a foil, in particular self-adhesive foil, to the surface such as the bodywork of a car are generally known. These usually comprise a handgrip and a pressing edge.

Such known foil applicators take diverse forms which almost without exception are based on a handgrip and take the form of a parallelepiped or a rectangle, as for instance known from US-2009/145557. The longer side edges of such handgrips are used here as pressing edges or surfaces. Such pressing edges and/or surfaces can be or are enclosed by felt and in cross-sectional side view taper to a point, or to at least a narrowed portion, so as to enable a more or less flexible pressure to be exerted on the foil so that it can be pressed onto the surface as far as possible without the inclusion of air bubbles.

The known foil applicators have various drawbacks. The known foil applicators can for instance not be used properly at edges, seams and transitions between parts of a surface to be covered and parts not to be covered because the edges of the handgrip used as pressing edges and surfaces are too wide (or long) to be utilized effectively and with sufficiently fine touch at such edges, seams and transitions. It is moreover the case that a separate tool is necessary—despite the high level of experience of some users—to pull back foil frequently when air bubbles occur, particularly when covering the surface at such edges, seams and transitions. Apart from the need for an additional tool, frequently having to pull back the foil does not enhance the quality thereof, although it is still usually unavoidable. When foil has to be pulled back during covering of a surface, which happens to even the most experienced users, they must then pick up and use a separate tool in order to release the foil again from the seams, edges and/or other transitions.

In addition, the users of a known foil applicator often also need an additional tool when foil has to be applied below or behind an edge of for instance rubber, as in the case of a window rubber of a car. Using such an additional tool the rubber edge must or can then be raised so as to apply the foil behind or below it. A user is thus also required to pick up another tool for this purpose.

The present invention has for its object to obviate or at least reduce to some extent the above stated and other drawbacks and/or problems of the known foil applicators. A foil applicator according to the present invention is for this purpose such that the handgrip is elongate and the pressing edge lies at an angle relative to a longitudinal direction of the handgrip. The foil applicator further comprises at least one hook, as further comprises all features defined in the single appended independent claim, including the features in the characterizing portion thereof.

A foil applicator according to the invention has the feature that the pressing edge is formed by a substantially triangular holder which is connected to the handgrip. A tip of the triangle can be directed here toward the handgrip and an opposite side of the triangular form can correspond to the pressing edge.

Further, according to the invention, the foil applicator has the feature that at least one of the sides of the triangular holder has a curved form so as to define a hook where the curved side of the triangular form of the holder and an end of the pressing surface approach each other. The intended functionality of the hook can thus be imparted/effected in very elegant and simple manner, and even result in minimizing the amount of material required.

A considerably better foil applicator is hereby provided than those known in the art.

Using the hook adhered foil can be pulled back, for instance out of or from edges, seams and transitions, in the event air bubbles have been included in the foil, without having to pick up another tool, which would take some time and during which time the foil could adhere more fixedly to the surface and the foil could be damaged even more when—after another tool has been picked up—it must then be released at or from the edges, seams and transitions. Using the hook of the foil applicator according to the present invention an edge of for instance rubber, such as a window rubber of a car, can also be raised in order to apply the foil below or behind it. The pressing edge lies as an angle relative to the handgrip. The handgrip is elongate. Together this results in a foil applicator which is very easy to use and which can be employed particularly when large surfaces have been completed during covering of the surface and during the covering a user begins to approach edges, seams and transitions.

In a preferred embodiment a foil applicator according to the invention has the feature that the handgrip comprises a pressing surface on the side opposite the pressing edge. Such a pressing surface can impart a further additional functionality to the foil applicator without an additional tool having to be picked up during application of foil to a surface, for instance for narrow strips of foil to be pressed onto the surface. In a further embodiment the foil applicator can for this purpose have the feature that the pressing surface comprises a narrowed portion at an outer end of the handgrip. In another embodiment such a foil applicator with a pressing surface has the feature that the pressing surface comprises a tapering reduction in the thickness of the handgrip. With the reduction in thickness and a corresponding choice of material a desired measure of flexibility can thus be imparted to the pressing surface as well as to the pressing edge, where the same measures can result in the same desired flexibility.

Additionally or alternatively, a preferred embodiment of a foil applicator according to the invention has the feature that the angle of the pressing edge relative to the longitudinal direction of the handgrip is smaller than 90 degrees and greater than 0 degrees, preferably lies in the range between 10 and 80 degrees, more preferably between 20 and 70 degrees and is most preferably about 30 or 60 degrees. In combination with the elongate handgrip this provides for a great ease of handling, other than prior art rectangular or parallelepipedal (plate-like) foil applicators.

The foil applicator can further be such here that the triangular form of the holder is that of a scalene triangle. The orientation of the pressing edge can hereby therefore also be effected in favourable manner relative to the longitudinal direction of the handgrip.

Additionally or alternatively, a preferred embodiment of a foil applicator according to the invention has the feature that the handgrip has an ergonomically defined form, with a thickened portion centrally along the handgrip. This further enhances the ease of handling.

Additionally or alternatively, a preferred embodiment of a foil applicator according to the invention has the feature that the foil applicator comprises more than one hook. These can then be a forward oriented hook and a rearward oriented hook relative to the handgrip. This enhances the multi-functionality.

Additionally or alternatively, a preferred embodiment of a foil applicator according to the invention has the feature of a holder for the pressing edge, and that the pressing edge and the holder form a unit. Alternatively, the pressing edge can be an exchangeable element which is releasable from the holder.

Following the above specification of the present invention and diverse facets and aspects thereof, a single preferred embodiment thereof will be described with reference to the accompanying drawing, in which in non-limitative manner and only by way of example the single embodiment of a foil applicator, in particular a spatula, is thus shown which is embodied in accordance with the present invention, and wherein the same or similar aspects, components and elements as well as functions are designated in the various figures with the same reference numerals. In the drawing:

FIG. 1 shows a schematic side view of a first embodiment of a spatula according to the present invention; and FIG. 2 shows a perspective schematic view of the spatula of FIG. 1.

FIGS. 1 and 2 show a spatula 1 as embodiment of a foil applicator according to the present invention. Spatula 1 comprises a handgrip 2 which is elongate and has an ergonomic shape and comprises a thickened portion 3 centrally along the length thereof. Arranged on the right-hand side is a holder 4, a free side of which forms or comprises a pressing edge 5. In the shown embodiment handgrip 2, holder 4 and pressing edge 5 are an integrated unit, or formed as one whole. By way of alternative the pressing edge 5 could be a separate and perhaps exchangeable element in holder 4.

The pressing edge lies at an angle α relative to the longitudinal direction of handgrip 2. This angle α can be smaller than 90 degrees and larger than 0 degrees. The angle α preferably lies in the range between 10 and 80 degrees, more preferably between 20 and 70 degrees and is most preferably about 30 or 60 degrees. An angle α can have diverse values in the context of the present invention, although an angle greater than 45 degrees would seem preferable from the viewpoint of convenience of use.

For the purpose of pressing foil with pressing edge 5, this pressing edge 5 must have a measure of flexibility. Such a flexibility can for instance be realized with a suitable choice of material and/or dimensioning (length and thickness) of holder 4 and pressing edge 5. In the shown embodiment holder 4 tapers for this purpose toward pressing edge 5. In order to form the pressing edge 5 with a great length (and so a wide operative range) the holder will however diverge in the direction transversely of the tapering.

Similar considerations in respect of flexibility apply for a pressing surface 6 at the end of handgrip 2 opposite holder 4 and the pressing edge. This pressing surface 6 is relatively very narrow compared to the length of pressing edge 5, and can thus serve to press down strips of foil (or narrow edges of wider pieces of foil) narrower than pressing edge 5. An additional functionality is thus provided. Pressing surface 6 tapers in the same orientation as pressing edge 5, although pressing surface 6 is narrower and for this purpose handgrip 2 tapers toward pressing surface 6.

It is noted that both pressing surface 6 and pressing edge 5 are highly suitable for applying smaller pieces of foil to a surface such as bodywork of a car, or are at least suitable for also applying such foil thereto in larger dimensions, in this case in smaller edges, seams and/or transitions. The shaping of pressing edge 5 as well as that of pressing surface 6 is for instance highly suitable, in contrast to prior art spatulas, for covering a surface around emblems (car brand logos, locks and the like) and for enabling the foil to be pressed on properly at these positions.

In combination with pressing edge 5 and handgrip 2 the holder 4 defines two hooks 7, 8 which each form a hook-like engaging element in the sense of the present invention. Hook 7 is oriented to the rear relative to the longitudinal direction of handgrip 2, while hook 8 is oriented forward. This is associated with the chosen shape of holder 4, which forms a scalene triangle. A shortest side thereof defines the rearward hook 7, the longest side thereof is associated with pressing edge 5 and the side with an intermediate length defines the forward oriented hook 8. Using hooks 7, 8 foil can be pulled back from seams, edges and transitions, for instance at headlights of a car, these hooks enabling very fine operation without it being necessary to pick up an additional foil applicator during work for this purpose. Depending on the angle, edge, seam or other transition from which foil has to be pulled back, the user can opt to use the forward or rearward hook 7, 8. The forward oriented hook 8 can thus be employed to raise a rubber edge, while the rearward oriented hook 7 will more often be utilized to pull back foil from edges, seams and/or transitions, although each of the two hooks can likewise be utilized for the other of these two applications or for another purpose.

After examination of the above described embodiments of the invention with reference to the accompanying drawing many alternative and additional embodiments will occur to the skilled person. These must however all be deemed as lying within the scope of protection of the present invention as defined in the appended claims. Even when an embodiment departs from the letter or spirit of the invention defined in the claims, it may still form an equivalent embodiment thereof.

It is thus possible for the invention to be realized in an embodiment with a single hook 7 or 8, or without pressing surface 6, or with a hook (not shown) at the end of the handgrip opposite holder 4 and pressing edge 5 (where the pressing surface 6 is arranged in the accompanying drawing, this instead of or as addition thereto). The handgrip can be formed from more than one part and the hook can be enclosed in a cavity of the handgrip for protection thereof, so that when a hook is required the user can take the handgrip apart in order to release the hook for use. Holder 4 with an integrated pressing edge 5 could be arranged exchangeably on the handgrip, and pressing surface 6 could likewise form part of a component to be arranged exchangeably on handgrip 2. In order to fulfill the hook function the sides of holder 4 corresponding to hooks 7, 8 are sharp edges. These sharp edges need not be as sharp as pressing edge 5, although this can indeed be the case in a possible embodiment.

It is thus the case that within the scope of the present invention there are many more possibilities and embodiments than only those which are specifically shown and described here and of which only several variants are directly referred to above.

The invention claimed is:

1. A foil applicator designed to apply self-adhesive foil to a surface, such as the bodywork of a car, comprising:
   handgrip;
   a pressing edge designed to press down the self-adhesive foil onto the surface, wherein the handgrip is elongate and the pressing edge lies at an oblique angle relative to a longitudinal direction of the handgrip;

at least one substantially hook-like engaging element, defined at least one end of the pressing edge; and a substantially triangular holder defining the pressing edge, which holder is connected to the handgrip, and at least one of the sides of the holder has a curved side defining the hook-like engaging element, where the curved side of the triangular form of the holder and an end of the pressing edge approach each other.

2. The foil applicator as claimed in claim 1, wherein the handgrip comprises a pressing surface on the side opposite the pressing edge.

3. The foil applicator as claimed in claim 2, wherein the pressing surface comprises a narrowed portion at an outer end of the handgrip.

4. The foil applicator as claimed in claim 2 wherein the pressing surface comprises a tapering reduction in the thickness of the handgrip.

5. The foil applicator as claimed in claim 1, wherein the angle of the pressing edge relative to the longitudinal direction of the handgrip is smaller than 90 degrees and greater than 0 degrees, preferably lies in the range between 10 and 80 degrees, more preferably between 20 and 70 degrees and is most preferably about 30 or 60 degrees.

6. The foil applicator as claimed in claim 1, wherein the triangular form of the holder is that of a scalene triangle.

7. The foil applicator as claimed in claim 1, wherein the handgrip has an ergonomically defined form, with a thickened portion centrally along the handgrip.

8. The foil applicator as claimed in claim 1, comprising more than one hook-like engaging element.

9. The foil applicator as claimed in claim 1, with a holder for the pressing edge, wherein the pressing edge and the holder form a unit.

10. The foil applicator as claimed in claim 1, with a holder for the pressing edge, wherein the pressing edge is an exchangeable element which is releasable from the holder.

* * * * *